US012416359B2

(12) United States Patent
Saunders et al.

(10) Patent No.: US 12,416,359 B2
(45) Date of Patent: Sep. 16, 2025

(54) SELF-FORMING GASKET ASSEMBLY AND METHODS OF CONSTRUCTION AND ASSEMBLY THEREOF

(71) Applicant: FEDERAL-MOGUL MOTORPARTS LLC, Southfield, MI (US)

(72) Inventors: Paul Saunders, Oxfordshire (GB);
Bartosz Gagor, Northlake, IL (US);
Edward Widder, Antioch, IL (US);
Rich Larson, Des Plaines, IL (US);
Steven Kueltzo, Aurora, IL (US)

(73) Assignee: FEDERAL-MOGUL MOTORPARTS LLC, Northville, MI (US)

( * ) Notice: Subject to any disclaimer, the term of this patent is extended or adjusted under 35 U.S.C. 154(b) by 695 days.

(21) Appl. No.: 16/528,468

(22) Filed: Jul. 31, 2019

(65) Prior Publication Data

US 2020/0040999 A1    Feb. 6, 2020

Related U.S. Application Data

(60) Provisional application No. 62/713,018, filed on Aug. 1, 2018.

(51) Int. Cl.
*F16J 15/08* (2006.01)
(52) U.S. Cl.
CPC ...... *F16J 15/0825* (2013.01); *F16J 2015/085* (2013.01)
(58) Field of Classification Search
CPC . F16J 15/0825; F16J 2015/085; F16J 15/0818
See application file for complete search history.

(56) References Cited

U.S. PATENT DOCUMENTS

| 3,909,019 | A | | 9/1975 | Leko | |
|---|---|---|---|---|---|
| 4,721,315 | A | * | 1/1988 | Ueta | F16J 15/0825 277/593 |
| 4,776,073 | A | * | 10/1988 | Udagawa | F16J 15/0825 156/260 |

(Continued)

FOREIGN PATENT DOCUMENTS

| CN | 102549318 A | 7/2012 |
|---|---|---|
| EP | 0369033 A1 | 5/1990 |

(Continued)

OTHER PUBLICATIONS

International Search Report, mailed Oct. 31, 2019 (PCT/US2019/044572).

*Primary Examiner* — Eugene G Byrd
(74) *Attorney, Agent, or Firm* — Dickinson Wright PLLC (57) ABSTRACT

A gasket assembly and methods of construction and assembly thereof are provided. The gasket assembly includes an elastically deformable, resilient carrier layer having an upper surface and a lower surface extending in planar, generally parallel relation with one another between an inner periphery and an outer periphery when in a disassembled state. At least one top layer is fixed to the upper surface proximate at least one of the inner periphery and the outer periphery. At least one bottom layer is fixed to the lower surface in radially spaced relation from the at least one top layer. The upper surface and the lower surface take on a non-planar, spring-biased shape upon compressing the gasket assembly between a pair of surfaces to an assembled state.

18 Claims, 3 Drawing Sheets

(56) References Cited

U.S. PATENT DOCUMENTS

| | | | |
|---|---|---|---|
| 5,197,747 A | | 3/1993 | Ueta et al. |
| 5,272,808 A | | 12/1993 | Udagawa et al. |
| 5,280,928 A | | 1/1994 | Ueta et al. |
| 5,322,299 A | * | 6/1994 | Terai .................... F16J 15/0818 |
| | | | 277/596 |
| 6,328,313 B1 | * | 12/2001 | Teranishi ............... F02F 11/002 |
| | | | 277/592 |
| 6,343,795 B1 | * | 2/2002 | Zerfass ................ F16J 15/0818 |
| | | | 277/593 |
| 6,848,690 B1 | * | 2/2005 | Hunter ................... F02F 11/002 |
| | | | 277/594 |
| 9,169,802 B2 | * | 10/2015 | Schumacher .......... F02F 11/002 |
| 10,619,725 B2 | * | 4/2020 | Schoellhammer .. F16H 61/0265 |
| 2001/0045708 A1 | * | 11/2001 | Hohe ...................... B23P 15/00 |
| | | | 277/592 |
| 2003/0075873 A1 | * | 4/2003 | Nakamura ........... F16J 15/0818 |
| | | | 277/593 |
| 2006/0232016 A1 | * | 10/2006 | Hilgert ................. F16J 15/0825 |
| | | | 277/593 |
| 2008/0143060 A1 | * | 6/2008 | Casler .................. F16J 15/0818 |
| | | | 277/654 |
| 2011/0079964 A1 | | 4/2011 | Swasey et al. |
| 2012/0286480 A1 | * | 11/2012 | Efremov .............. F16J 15/0806 |
| | | | 277/626 |

FOREIGN PATENT DOCUMENTS

| | | | | |
|---|---|---|---|---|
| EP | 0465268 A1 | | 1/1992 | |
| JP | 01153872 A | | 6/1989 | |
| WO | WO-2005017395 A1 | * | 2/2005 | ........... F16J 15/0825 |

* cited by examiner

SELF-FORMING GASKET ASSEMBLY AND METHODS OF CONSTRUCTION AND ASSEMBLY THEREOF

CROSS-REFERENCE TO RELATED APPLICATION

This application claims the benefit of U.S. Provisional Application Ser. No. 62/713,018, filed Aug. 1, 2018, which is incorporated herein by reference in its entirety.

BACKGROUND

1. Field of the Invention

The present invention is related generally to gasket assemblies and in particular to multi-layer gasket assemblies which can flex to maintain a seal between two components (such as an exhaust manifold and a cylinder head) as the components move relative to one another.

2. Related Art

Multi-layer steel (MLS) gaskets, such as of the type for use as exhaust manifold gaskets in internal combustion engines, typically include one or more functional layers that are pre-formed through an embossment operation to have one or more compression beads. When installed in an engine, the compression bead(s) flexes to maintain fluid and gas tight seals between two mating flanges of the exhaust manifold and cylinder head of the engine. Production of such MLS gaskets involves a blanking operation and an embossment process and, in some cases, a welding operation to fixedly attach a stopper layer with one or more of the at least one functional layer.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

It is an object of the present disclosure to provide a gasket assembly having a self-forming carrier layer that overcomes disadvantages of known gasket assemblies.

It is a further object of the present disclosure to provide a method of constructing a gasket assembly having a self-forming carrier layer that overcomes disadvantages of known methods of constructing gasket assemblies.

It is a further object of the present disclosure to provide a gasket assembly that is economical in manufacture and assembly and that exhibits a long and useful life.

In accordance with these objectives, as well as others, which will be appreciated by those possessing ordinary skill in the art of gasket assemblies, the present disclosure is directed to providing a gasket assembly for motor vehicle and non-vehicle applications and to a method of construction thereof.

In accordance with one aspect, the present disclosure is directed to a gasket assembly which advances the art and improves upon currently known gasket assemblies for motor vehicles.

In another aspect, the present disclosure is directed to a method of construction of a gasket assembly which advances the art and improves upon currently known methods of construction for gasket assemblies for motor vehicles.

In accordance with these and other objects, advantages, and aspects, a gasket assembly is provided including an elastically deformable carrier layer having an upper surface and a lower surface extending in planar, generally parallel relation with one another between an inner periphery and an outer periphery when in a disassembled state. At least one top layer is fixed to the upper surface proximate at least one of the inner periphery and the outer periphery. At least one bottom layer is fixed to the lower surface in radially spaced relation from the at least one top layer, wherein the upper surface and the lower surface take on a non-planar, spring-biased shape upon compressing the gasket assembly between a pair of surfaces to an assembled state.

In accordance with another aspect of the disclosure, the at least one top layer is provided as a single, sole top layer fixed proximate said inner periphery and said at least one bottom layer is a single bottom layer spaced outwardly from said top layer.

In accordance with another aspect of the disclosure, the top layer has a uniform thickness and the bottom layer has a uniform thickness, the uniform thicknesses of the annular top layer and the annular bottom layer being the same.

In accordance with another aspect of the disclosure, the top layer has a width and the bottom layer has a width, the widths of the top layer and the bottom layer being the same.

In accordance with another aspect of the disclosure, the at least one top layer includes a pair of top layers, with one of the pair of top layers being fixed proximate the inner periphery and the other of the pair of top layers being fixed proximate the outer periphery, with the at least one bottom layer being spaced between the pair of top layers.

In accordance with another aspect of the disclosure, each of the pair of top layers has a thickness and the bottom layer has a thickness, the thicknesses of the annular top layers being the same.

In accordance with another aspect of the disclosure, each of the pair of top layers has a radially extending width and the bottom layer has a radially extending width, the radially extending widths of the pair of top layers and the bottom layer being the same.

In accordance with another aspect of the disclosure, one of the pair of top layers and the at least one bottom layer are spaced from one another a first distance and the other of the pair of top layers and the at least one bottom layer are spaced from one another a second distance, wherein the first distance and the second distance are the same.

In accordance with another aspect of the disclosure, the at least one top layer can be provided as being peripherally continuous and the at least one bottom layer can be provided as being peripherally continuous.

In accordance with another aspect of the disclosure, the at least one top layer can be provided as being circular and the at least one bottom layer can be provided as being circular.

In accordance with another aspect of the disclosure, a method of constructing a gasket assembly is provided. The method includes providing an elastically deformable, resilient carrier layer having an upper surface and a lower surface extending in planar, generally parallel relation with one another between an inner periphery and an outer periphery when in a disassembled state. Further, fixing at least one top layer to the upper surface proximate at least one of the inner periphery and the outer periphery. Further yet, fixing at least one bottom layer to the lower surface in radially spaced relation from the at least one top layer, wherein the upper surface and the lower surface take on a non-planar, spring-biased shape upon compressing the gasket assembly between a pair of surfaces to an assembled state.

In accordance with another aspect of the disclosure, the method of constructing a gasket assembly can further include fixing the at least one top layer as a single, sole top layer to the upper surface proximate at least one of the inner periphery and the outer periphery.

In accordance with another aspect of the disclosure, the method of constructing a gasket assembly can further include providing the top layer having a thickness and providing the bottom layer having a thickness, with the thicknesses of the top layer and the bottom layer being the same.

In accordance with another aspect of the disclosure, the method of constructing a gasket assembly can further include providing the top layer having a width and providing the bottom layer having a width, with the widths of the top layer and the bottom layer being the same.

In accordance with another aspect of the disclosure, the method of constructing a gasket assembly can further include fixing the at least one top layer including a pair of top layers, and fixing one of the pair of top layers proximate the inner periphery and fixing the other of the pair of top layers proximate the outer periphery, and fixing the at least one bottom layer in spaced relation between the pair of top layers.

In accordance with another aspect of the disclosure, the method of constructing a gasket assembly can further include providing each of the pair of top layers having a thickness and providing the bottom layer having a thickness, the thicknesses of the annular top layers being the same.

In accordance with another aspect of the disclosure, the method of constructing a gasket assembly can further include providing each of the pair of top layers having a radially extending width and providing the bottom layer having a radially extending width, the radially extending widths of the pair of top layers and the bottom layer being the same.

In accordance with another aspect of the disclosure, the method of constructing a gasket assembly can further include spacing one of the pair of top layers and the at least one bottom layer from one another a first distance and spacing the other of the pair of top layers and the at least one bottom layer from one another a second distance, wherein the first distance and the second distance are the same.

In accordance with another aspect of the disclosure, a method of assembling a gasket assembly into an internal combustion engine is provided. The method includes providing the gasket assembly having an elastically deformable, resilient carrier layer having an upper surface and a lower surface extending in planar, generally parallel relation with one another between an inner periphery and an outer periphery when in a disassembled state; at least one top layer fixed to the upper surface proximate at least one of the inner periphery and the outer periphery; and at least one bottom layer fixed to the lower surface in radially spaced relation from the at least one top layer. Further, sandwiching the gasket assembly between opposite surfaces to be fixed together in sealed relation with one another. Then, fixing the opposite surfaces to one another and compressing the at least one top layer and the at least one bottom layer in opposite axial directions and causing the upper surface and the lower surface of the carrier layer to take on a non-planar, spring-biased shape, thereby causing the at least one top layer to exert a sealing force against one of the opposite surfaces in a first axial direction to form a seal there against and causing the at least one bottom layer to exert a sealing force against the other of the opposite surfaces in a second axial direction opposite the first axial direction to form a seal there against.

In accordance with another aspect of the disclosure, the method of assembling a gasket assembly into an internal combustion engine can further include providing the at least one top layer as a single, sole top layer fixed to the upper surface proximate at least one of the inner periphery and the outer periphery.

In accordance with another aspect of the disclosure, the method of assembling a gasket assembly into an internal combustion engine can further include providing the at least one top layer including a pair of top layers, with one of the pair of top layers being fixed proximate the inner periphery and the other of the pair of top layers being fixed proximate the outer periphery, and providing the at least one bottom layer in spaced relation between the pair of top layers, thereby causing the pair of top layers to each exert a sealing force against one of the opposite surfaces in a first axial direction to form a seal there against and the at least one bottom layer to exert a sealing force against the other of the opposite surfaces in a second axial direction opposite the first axial direction to form a seal there against.

In accordance with another aspect of the disclosure, the method of assembling a gasket assembly into an internal combustion engine can further include providing the at least one bottom layer as a single, sole bottom layer fixed to the lower surface between the pair of top layers.

BRIEF DESCRIPTION OF THE DRAWINGS

These and other aspects, features and advantages of the invention will become more readily appreciated when considered in connection with the following description of the presently preferred embodiments, appended claims and accompanying drawings, in which:

DETAILED DESCRIPTION OF EXAMPLE EMBODIMENTS

Referring to the Figures, wherein like numerals indicate corresponding parts throughout the several views, a first exemplary embodiment of self-forming (self-biasing, self-sealing) gasket assembly, referred to hereafter as gasket assembly 20, which is constructed according to one aspect of the present disclosure, is generally shown in FIGS. 1-4.

Figures 6, 7, 8, 9:
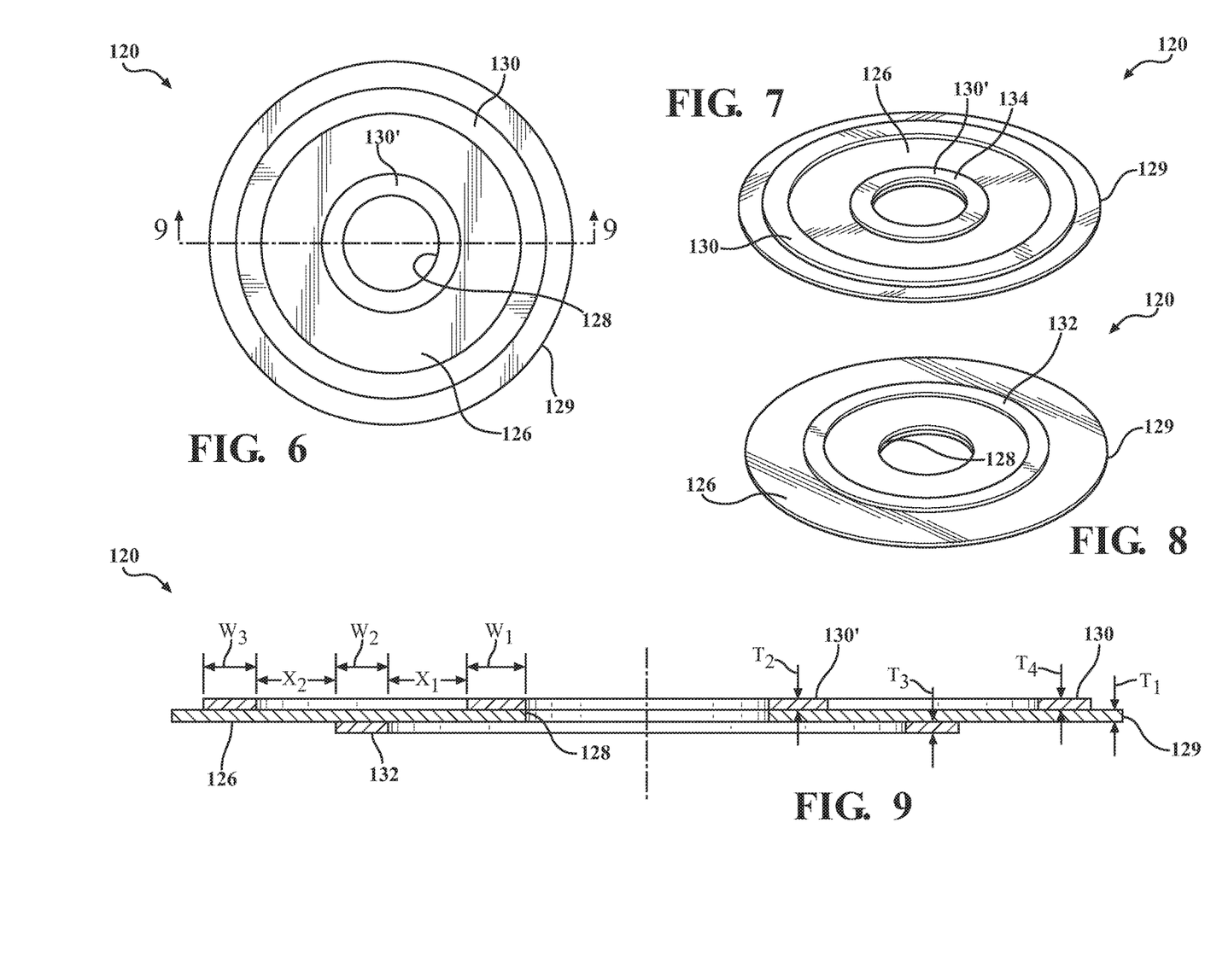
FIG. 6 is a top plan view of a gasket assembly constructed in accordance with another aspect of the disclosure.
FIG. 7 is a top perspective view of the gasket assembly of FIG. 6.
FIG. 8 is a bottom perspective view of the gasket assembly of FIG. 6.
FIG. 9 is a cross-sectional view of the gasket assembly of FIG. 8 taken generally along the line 9-9.
Figure 10:
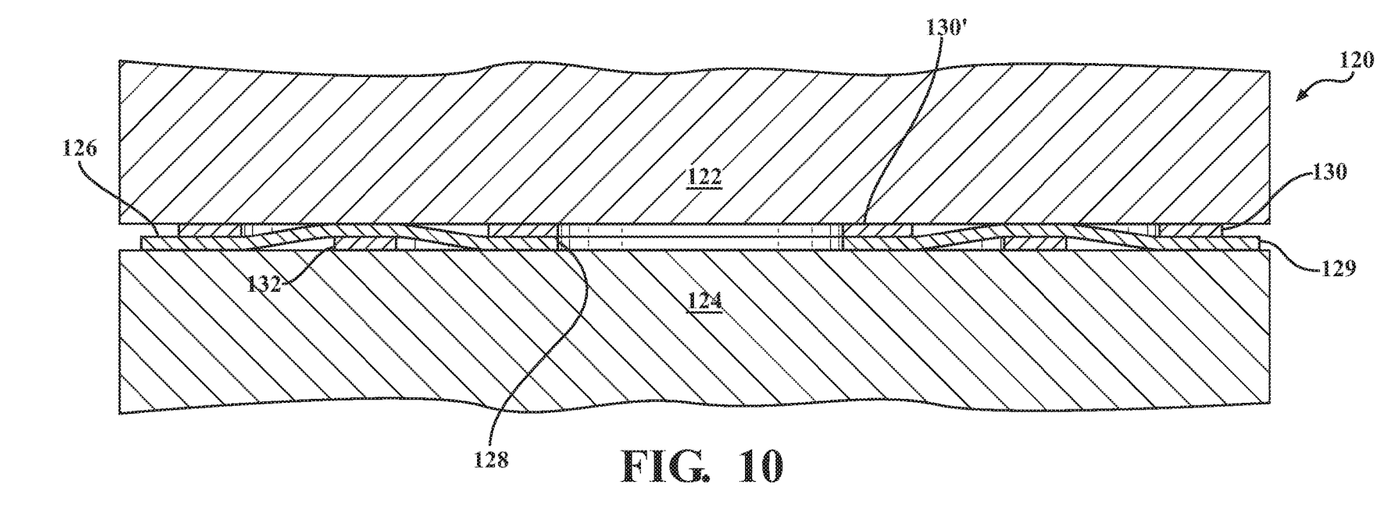
FIG. 10 is a cross-sectional view of the gasket assembly of FIG. 6 as installed between two mating flanges of an internal combustion engine.

In the first exemplary embodiment, the gasket assembly 20 is an exhaust manifold gasket, by way of example and without limitation, with it to be understood that the teachings herein are applicable to any type of gasket, such as a cylinder head gasket, or any other location requiring sealing between parts to be sealed with one another, which is configured to automatically deform elastically and resiliently to establish a gas tight seal between a pair of surfaces upon clamping the surfaces together, such as an exhaust manifold 22 (FIG. 6) and a cylinder head 24 (FIG. 6) in an internal combustion engine by way of example and without limitation. As discussed in further detail below, although the gasket assembly 20 lacks any preformed, raised seal beads, as are commonly formed via embossing processes and found in MLS-type gaskets, gasket assembly 20 is nonetheless able to elastically flex to resiliently maintain the gas tight seal between the exhaust manifold 22 and the cylinder head 24 as the exhaust manifold 22 lifts at least partially away from the cylinder head 24 during operation of the internal combustion engine. The gasket assembly 20 is also more economical to manufacture as compared to other known gasket assemblies because the equipment and labor required to emboss one or more gasket layers are not required.

The gasket assembly 20 includes an active layer, also known as a functional carrier layer, referred to hereafter as carrier layer 26, which is made as a monolithic sheet of a resilient, elastically deformable metal, such as steel, spring grade steel (spring steel) or an alloy steel. The carrier layer 26 has at least one inner periphery 28 which surrounds an opening which may correspond to, for example, a cylinder bore, a coolant channel, or an exhaust port, and an outer periphery 29. The carrier layer 26 has a generally uniform, constant first thickness $T_1$ extending between a top face, also referred to as upper surface 25, and a lower face, also referred to as lower surface 27. Upper surface 25 and lower surface 27 extend in parallel or generally parallel relation with one another, with upper surface 25 and lower surface 27 being planar while in a disassembled state.

At least one first layer, such as a peripherally continuous layer, which can be circular, square, rectangular, or any geometric shape, also referred to as annular top layer or simply top layer 30, is fixedly attached to top face 25 of the carrier layer 26 proximate at least one of the inner periphery 28 and the outer periphery 29, and at least one second layer, such as a peripherally continuous layer, which can be circular, square, rectangular, or any geometric shape, also referred to as annular bottom layer or simply bottom layer 32, is fixedly attached to the bottom face 27 of the carrier layer 26 in radially spaced relation from the at least one top layer 30. The bottom layer(s) 32 has a generally constant second thickness $T_2$ extending between opposite faces 31, 33, and the top layer(s) 30 has a generally constant third thickness $T_3$ extending between opposite faces 35, 37. In the first exemplary embodiment, the second and third thicknesses $T_2$, $T_3$ are the same or approximately equal to one another and are the same or similar to the first thickness $T_1$ of the carrier layer 26, though it is contemplated herein that their thicknesses $T_1$, $T_3$ could be different. In the embodiment illustrated in FIGS. 1-5, the at least one annular top layer 30 is a single annular top layer 30 having the lower face 37 fixed proximate the inner periphery 28 and the at least one annular bottom layer 32 is a single annular bottom layer 32 spaced outwardly, such as being spaced radially outwardly from the annular top layer 30 having the upper face 31 fixed proximate the outer periphery 29. The top and bottom layers 30, 32 are preferably made of the same metal as the carrier layer 26 and are preferably fixedly attached with the carrier layer via a weld joint in a welding process and/or via suitable adhesives. Similar to the carrier layer 26, the top and bottom layers 30, 32 are sheet-like, i.e., generally planar along their opposite faces 31, 33, 35, 37, wherein the opposite faces 31, 33, 35, 37 are parallel or generally parallel to one another.

Figure 1:
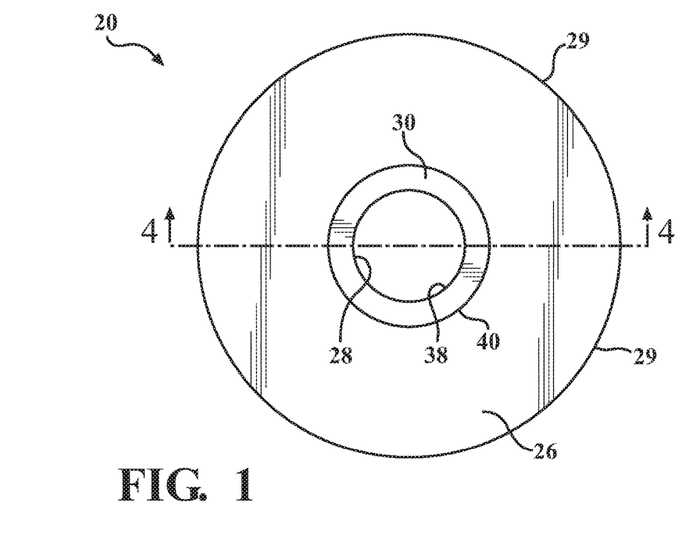
FIG. 1 is a top plan view of a gasket assembly constructed in accordance with one aspect of the disclosure.
Figure 2:
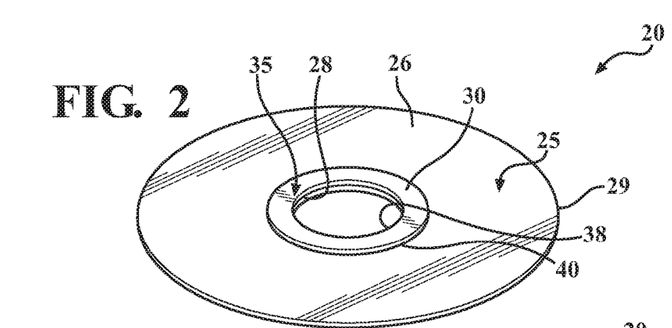
FIG. 2 is a top perspective view of the gasket assembly of FIG. 1.
Figure 3:
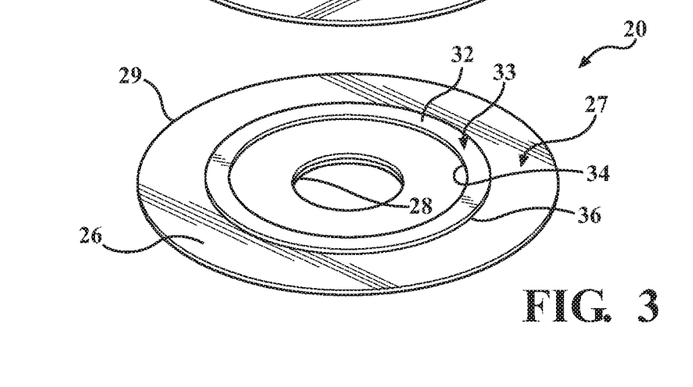
FIG. 3 is a bottom perspective view of the gasket assembly of FIG. 1.
Figure 4:
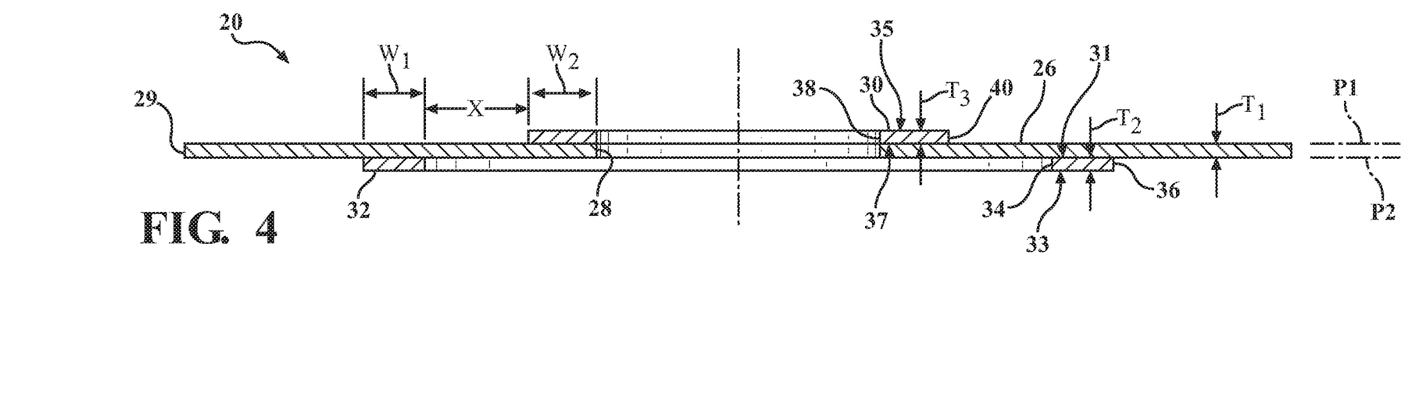
FIG. 4 is a cross-sectional view of the gasket assembly of FIG. 1 taken generally along the line 4-4.

Each of the top and bottom layers 30, 32 can be annular and toroidal in shape, by way of example and without limitation, with an inner periphery and an outer periphery and has a respective radial width extending between the inner periphery and outer periphery. Specifically, the bottom layer 32 has a first radial width $W_1$ extending between its inner periphery 34 and outer periphery 36, and the top layer 30 has a second radial width $W_2$ extending between its inner periphery 38 and outer periphery 40, and the first and second radial widths $W_1$, $W_2$ are equal or similar to one another, though it is contemplated herein that their widths $W_1$, $W_2$ could be different. As best shown in FIG. 4, the outer periphery 40 of the top layer 30 is spaced radially inwardly of the inner periphery 34 of the bottom layer 32 by a horizontal edge distance X. Thus, the gasket assembly 20 has only the first thickness $T_1$ of carrier layer 26 in an area of the horizontal edge distance X and radially outwardly from bottom layer 32 and has a greater total thickness ($T_1+T_2$ or $T_1+T_3$) in the areas extending along the top and bottom layers 30, 32.

Referring now to FIG. 4, before the gasket assembly 20 is installed to an assembled state in the internal combustion engine, the carrier layer 26, while in a disassembled state, is planar, with the opposite upper and lower surfaces 25, 27 thereof extending along respective planes P1, P2 in planar, parallel relation with one another, and thus the top layer 30 is disposed in its entirety vertically upwardly above plane P1, while bottom layer 32 is disposed in its entirety vertically downwardly below plane P2. Accordingly, top layer 30 and bottom layer 32 and extend along planes in parallel relation with one another, with the planes along which top layer 30 and bottom layer 32 extend being spaced from one another by at least the thickness $T_1$ of carrier layer 26. Accordingly, the total combined thickness of gasket assembly 20 while in an un-deformed, relaxed state is $T_1+T_2+T_3$.

Figure 5:
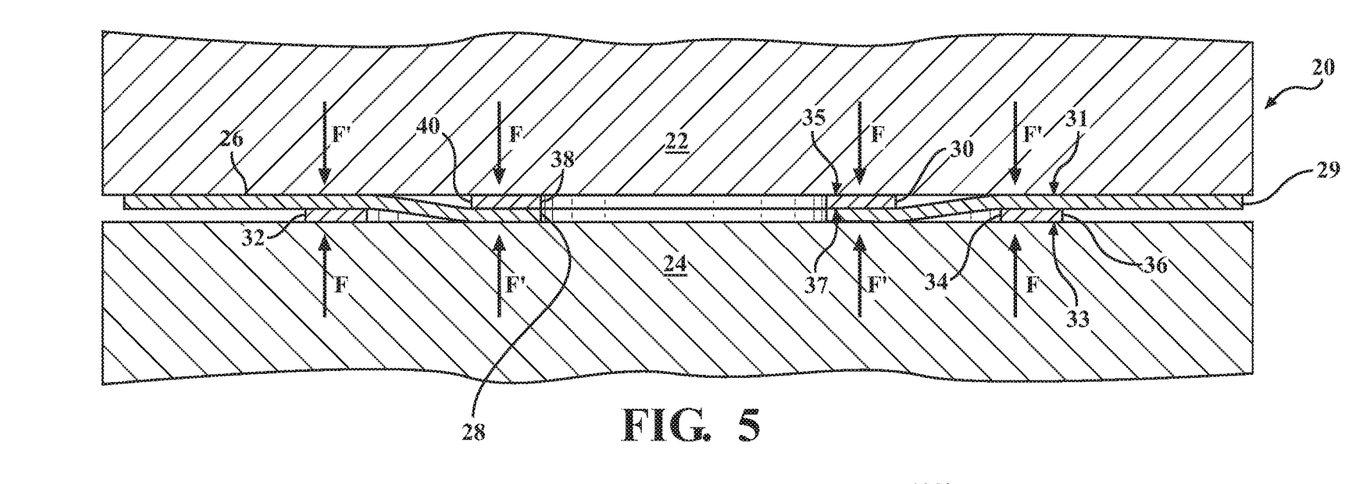
FIG. 5 is a cross-sectional view of the gasket assembly of FIG. 1 as installed between two mating flanges of an internal combustion engine.

When the gasket assembly 20 is installed in the internal combustion engine and the exhaust manifold 22 is fixed, such as via being bolted, to the cylinder head 24, opposite forces (identified as F in FIG. 5) are applied to the top and bottom layers 30, 32 and the forces F are imparted into the carrier layer 26. These opposing forces F applied directly to top face 31 of top layer 30 and to bottom face 33 of bottom layer 32 cause the carrier layer 26 to bend and deform elastically and resiliently in the area of the horizontal edge distance X to the shape shown in FIG. 5 to assume an elastically and resiliently deformed assembled state. In the embodiment described and illustrated, the gasket assembly 20, while in its assembled state, is caused to take on a generally S-curved shape extending between the inner and outer periphery 28, 29, as viewed in lateral cross-section (FIG. 5). As such, upon being brought to the assembled state, the top layer 30 and bottom layer 32 are caused to be brought into coplanar relation with one another, at least in part, with a portion of the thickness T2 of bottom layer 32 and a portion of the thickness T3 of top layer 30 being coplanar. Because the deformation is elastic and resilient, the bend in the carrier element 26 serves as an elastic and resilient functional sealing feature which allows the carrier element 26 to flex resiliently in spring-biased fashion with equal and opposite forces F' to the opposed forces F maintaining both of the top and bottom layers 30, 32 in sealed engagement with the surfaces clamped toward one another, e.g. exhaust manifold 22 and the cylinder head 24, respectively, even as the exhaust manifold 22 deflects away from the cylinder head 24. Because the elastic, resilient bend is automatically imparted into the carrier layer 26 during installation of the gasket assembly 20 into the engine, no step of embossing or otherwise plastically deforming step of the carrier layer 26 before installing it in the engine is required, and thus, the sealing aspect of gasket assembly 20 is self-forming without the expense of forming processes. Accordingly, prior to assembly, the carrier layer 26 remains un-deformed and planar and without embossed or otherwise plastically deformed features.

Referring now to FIGS. 7-10, a second exemplary embodiment of a gasket assembly 120 is generally shown, wherein like reference numerals as used above, offset by a factor of 100, are used to identify like features. In contrast to the first exemplary embodiment, the gasket assembly 120 includes a plurality of, shown as a pair of, by way of example and without limitation, first and second top layers 130, 130', such as annularly-shaped, by way of example and without limitation, (specifically, a radially inner top layer 130' and a radially outer top layer 130) in addition to a single annularly-shaped third layer, also referred to as bottom layer 132. The inner top layer 130' has a first width $W_1$, the bottom layer 132 has a second width $W_2$, and the outer top layer 130 has a third width W3, wherein the respective first and second $W_1$, $W_2$, can be the same, whereas the width W3 can be the same or different from the widths $W_1$, $W_2$, as desired for the intended application.

The inner top layer 130' is spaced in radially staggered relation inwardly from the bottom layer 132 by a first horizontal edge distance $X_1$, and the bottom layer 132 is spaced in radially stagger relation inwardly from the outer top layer 130 by a second horizontal edge distance $X_2$, wherein $X_1$ and $X_2$ can be provided as desired, including being the same or different. Accordingly, one of the pair of annular top layers 130' is fixed proximate an inner periphery 128 and the other of the pair of annular top layers 130 is fixed proximate an outer periphery 129, with the at least one annular bottom layer 132 being spaced radially between the pair of annular first and second top layers 130, 130'. Thus, when the gasket assembly 120 is clamped between two flanges or surfaces, such as exhaust manifold 22 and the cylinder head 24, in an internal combustion engine, as discussed above for gasket 20, the carrier layer 126 will bend and be able to flex resiliently in the areas of both of the first and second horizontal edge distances $X_1$, $X_2$. In the embodiment described and illustrated, the carrier layer 126 of the gasket assembly 120 is caused to take on a generally bell-curved shape extending between the inner periphery 128 and outer periphery 129. Accordingly, prior to assembly, the carrier layer 126 remains planar and without embossments.

In this embodiment, the inner top layer 130' has a second thickness $T_2$, the bottom layer 132 has a third thickness $T_3$, and the outer top layer 130 has a fourth thickness $T_4$. The second, third, and fourth thicknesses $T_2$, $T_3$, $T_4$ are all the same, by way of example and without limitation. Alternately, the second and fourth thicknesses $T_2$, $T_4$ of the inner and outer top layers 130', 130 respectively could be the same, and the third thickness $T_3$ of the bottom layer 132 could be different from $T_2$, $T_4$.

In accordance with another aspect of the disclosure, a method of constructing a gasket assembly 20, 120 is provided. The method includes providing an elastically deformable, resilient functional carrier layer, referred to hereafter as carrier layer 26, 126 having an upper surface 25, 125 and a lower surface 27, 127 extending in planar, generally parallel relation with one another between an inner periphery 28, 128 and an outer periphery 29, 129 when in a disassembled state. Further, fixing at least one top layer 30, 130, such as annular top layers 30, 130, by way of example and without limitation, to the upper surface 25, 125 proximate at least one of the inner periphery 28, 128 and the outer periphery 29, 129. Further, fixing at least one bottom layer 32, 132, such as an annular bottom layer 32, 132, by way of example and without limitation, to the lower surface 27, 127 in radially spaced relation from the at least one annular top layer 30, 130, wherein the upper surface 25, 125 and the lower surface 27, 127 are caused to take on a non-planar, spring-biased shape upon the gasket assembly being compressed between a pair of surfaces 22, 24 to an assembled state.

In accordance with a further aspect of the disclosure, the method can further include providing the at least one annular top layer as a single, sole top layer 30 fixed to the upper surface 25 proximate at least one of the inner periphery 28 and the outer periphery 29.

In accordance with a further aspect of the disclosure, the method can further include providing the at least one annular top layer including a pair of annular top layers 130, 130', with one of the pair of annular top layers 130' being fixed proximate the inner periphery 128 and the other of the pair of annular top layers 130 being fixed proximate the outer periphery 129, and providing the at least one annular bottom layer 132 in radially spaced relation between the pair of annular top layers 130, 130', thereby causing the pair of annular top layers 130, 130' to each exert a sealing force against one of the opposite surfaces 22 in a first axial direction to form an annular seal there against and the at least one annular bottom layer 132 to exert a sealing force against the other of the opposite surfaces 24 in a second axial direction opposite the first axial direction to form an annular seal there against.

In accordance with a further aspect of the disclosure, the method can further include providing the at least one annular bottom layer as a single, sole bottom layer 132 fixed to the lower surface 127 between the pair of annular top layers 130, 130'.

As noted above, it is to be recognized that the top and bottom layers 30, 32, 130, 132 discussed herein can take on any desired peripheral shape, including round, square, rectangular, or otherwise, and further, that the top and bottom layers 30, 32, 130, 132 can be peripherally continuous or discontinuous, as desired.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other. It should also be appreciated that directional terms, such as "top" and "bottom" are in reference to the particular orientations of the features in one or more of the drawings and are not intended to require the gasket assembly to have any particular orientation.

What is claimed is:

1. A gasket assembly, comprising:
    an elastically deformable, resilient carrier layer having an upper surface and a lower surface extending in planar, generally parallel relation with one another between an inner periphery and an outer periphery when in a disassembled state;

a pair of top layers made of metal and fixed to said upper surface proximate at least one of said inner periphery and said outer periphery;

at least one bottom layer made of metal and fixed inseparably to said lower surface in radially spaced relation from said at least one top layer;

wherein said upper surface and said lower surface take on a non-planar, spring-biased shape upon compressing the gasket assembly between a pair of surfaces to an assembled state; and said pair of top layers being spaced radially from one another and said bottom layer being spaced radially between said pair of top layers by a pair of radial gaps which are devoid of any material that extends above said top and bottom layers, respectively such that said resilient carrier layer deforms within said gaps upon compression of the gasket assembly.

2. The gasket assembly of claim 1, wherein each of said pair of top layers has a thickness and said bottom layer has a thickness, the thicknesses of said top layers being the same.

3. The gasket assembly of claim 1, wherein each of said pair of top layers has a width and said bottom layer has a width, the widths of said pair of top layers and said bottom layer being the same.

4. The gasket assembly of claim 1, wherein one of said pair of top layers and said at least one bottom layer are spaced from one another a first distance and the other of said pair of top layers and said at least one bottom layer are spaced from one another a second distance, wherein the first distance and the second distance are the same.

5. The gasket assembly of claim 1, wherein said at least one top layer is peripherally continuous and said at least one bottom layer is peripherally continuous.

6. The gasket assembly of claim 5, wherein said at least one top layer is circular and said at least one bottom layer is circular.

7. A method of constructing a gasket assembly, comprising:

providing an elastically deformable, resilient carrier layer having an upper surface and a lower surface extending in planar, generally parallel relation with one another between an inner periphery and an outer periphery when in a disassembled state;

fixing a pair of top layers that are made of metal to said upper surface proximate at least one of said inner periphery and said outer periphery; and fixing at least one bottom layer that is made of metal inseparably to said lower surface in radially spaced relation from said top layers such that said top layers are spaced radially from said bottom layer by a pair of radial gaps that are devoid of any material that extends above the level of the top and bottom layers, wherein said upper surface and said lower surface take on a non-planar, spring-biased shape in said radial gaps upon compressing the gasket assembly between a pair of surfaces to an assembled state.

8. The method of claim 7, further including providing each of the pair of top layers having a thickness and providing the bottom layer having a thickness, the thicknesses of the top layers and the bottom layer being the same.

9. The method of claim 7, further including providing each of the pair of top layers having a width and providing the bottom layer having a width, the widths of the pair of top layers and the bottom layer being the same.

10. The method of claim 7, further including spacing one of the pair of top layers and the at least one bottom layer from one another a first distance and spacing the other of the pair of top layers and the at least one bottom layer from one another a second distance, wherein the first distance and the second distance are the same.

11. A method of assembling a gasket assembly into an internal combustion engine, comprising:

providing the gasket assembly including an elastically deformable, resilient carrier layer having an upper surface and a lower surface extending in planar, generally parallel relation with one another between an inner periphery and an outer periphery when in a disassembled state; a pair of top layers made of metal and fixed to said upper surface proximate at least one of said inner periphery and said outer periphery; and at least one bottom layer made of metal and fixed inseparably to said lower surface in spaced relation from said at least one top layer such that the top layers are spaced radially from the bottom layer by radial gaps that are devoid of any material that extends above the level of the top and bottom layers;

sandwiching the gasket assembly between opposite surfaces to be fixed together in sealed relation with one another; and fixing the opposite surfaces to one another and compressing the pair of top layers and the at least one bottom layer in opposite axial directions and causing the upper surface and the lower surface of the carrier layer to take on a non-planar, spring-biased shape, in the radial gaps thereby causing the at least one top layer to exert a sealing force against one of the opposite surfaces in a first axial direction to form a seal there against and the at least one bottom layer to exert a sealing force against the other of the opposite surfaces in a second axial direction opposite the first axial direction to form a seal there against.

12. The method of claim 11, further including providing the at least one bottom layer as a single, sole bottom layer fixed to the lower surface between the pair of top layers.

13. A gasket assembly, comprising:

an elastically deformable, resilient carrier layer having an upper surface and a lower surface extending in planar generally spaced relation with one another between an inner periphery and an outer periphery when in a disassembled state;

at least one top layer made of metal fixed to said upper surface proximate at least one of said inner periphery and said outer periphery;

at least one bottom layer fixed inseparably to said lower surface in radially spaced relation from said at least one top layer;

said upper surface and said lower surface take on a non-planar, spring-biased shape upon compressing the gasket assembly between a pair of surfaces to an assembled state; and said inner periphery and said outer periphery of said carrier layer being concentric with one another and with said at least one top layer and said at least one bottom layer.

14. The gasket assembly as set forth in claim 13 wherein said inner periphery and said outer periphery of said carrier layer are circular in shape.

15. The gasket assembly as set forth in claim 1, wherein the bottom layer is fixed inseparably to the lower surface by a weld joint or adhesive.

16. The gasket assembly as set forth in claim 7, wherein the bottom layer is fixed inseparably to the lower surface by a weld joint or adhesive.

17. The gasket assembly as set forth in claim 11, wherein the bottom layer is fixed inseparably to the lower surface by a weld joint or adhesive.

18. The gasket assembly as set forth in claim 15, wherein the bottom layer is fixed inseparably to the lower surface by a weld joint or adhesive.

\* \* \* \* \*